United States Patent [19]
Arneson

[11] 3,868,679
[45] Feb. 25, 1975

[54] BLOOD PRESSURE AMPLIFIER WITH ZERO BALANCING MEANS

[75] Inventor: Harold N. Arneson, Oak Creek, Wis.

[73] Assignee: General Electric Company, Schenectady, N.Y.

[22] Filed: Oct. 9, 1973

[21] Appl. No.: 404,165

[52] U.S. Cl. .................. 340/347 AD, 128/2.05 A
[51] Int. Cl. ..................................... H03k 13/17
[58] Field of Search ......... 340/347 AD; 128/2.05 A, 128/2.05 E, 2.05 M, 2.05 N, 2.05 Q

[56] References Cited
UNITED STATES PATENTS

| | | | |
|---|---|---|---|
| 3,316,751 | 5/1967 | Burk | 73/23.1 |
| 3,422,424 | 1/1969 | Belet | 340/347 AD |
| 3,493,964 | 2/1970 | Hunger | 340/347 AD |
| 3,509,557 | 4/1970 | Groth | 340/347 AD |
| 3,573,794 | 4/1971 | Widenor | 340/347 AD |

Primary Examiner—Malcolm A. Morrison
Assistant Examiner—Vincent J. Sunderdick
Attorney, Agent, or Firm—Ralph G. Hohenfeldt; Fred Wiviott

[57] ABSTRACT

An amplifier for the signal from a blood pressure transducer is balanced to zero reference by introducing its offset signal and an offset balancing or correction signal to a summing amplifier. The resulting difference signal is fed to a comparator. A trigger signal at the start of balancing starts some digital counters counting. The digital output signal from the counters is converted to an analog correction signal which is fed to the summing amplifier. When the offset signal magnitude crosses the analog correction signal, the comparator switches and stops the counting. The analog correction signal is then available for use by the amplifier when blood pressure is actually measured.

2 Claims, 1 Drawing Figure

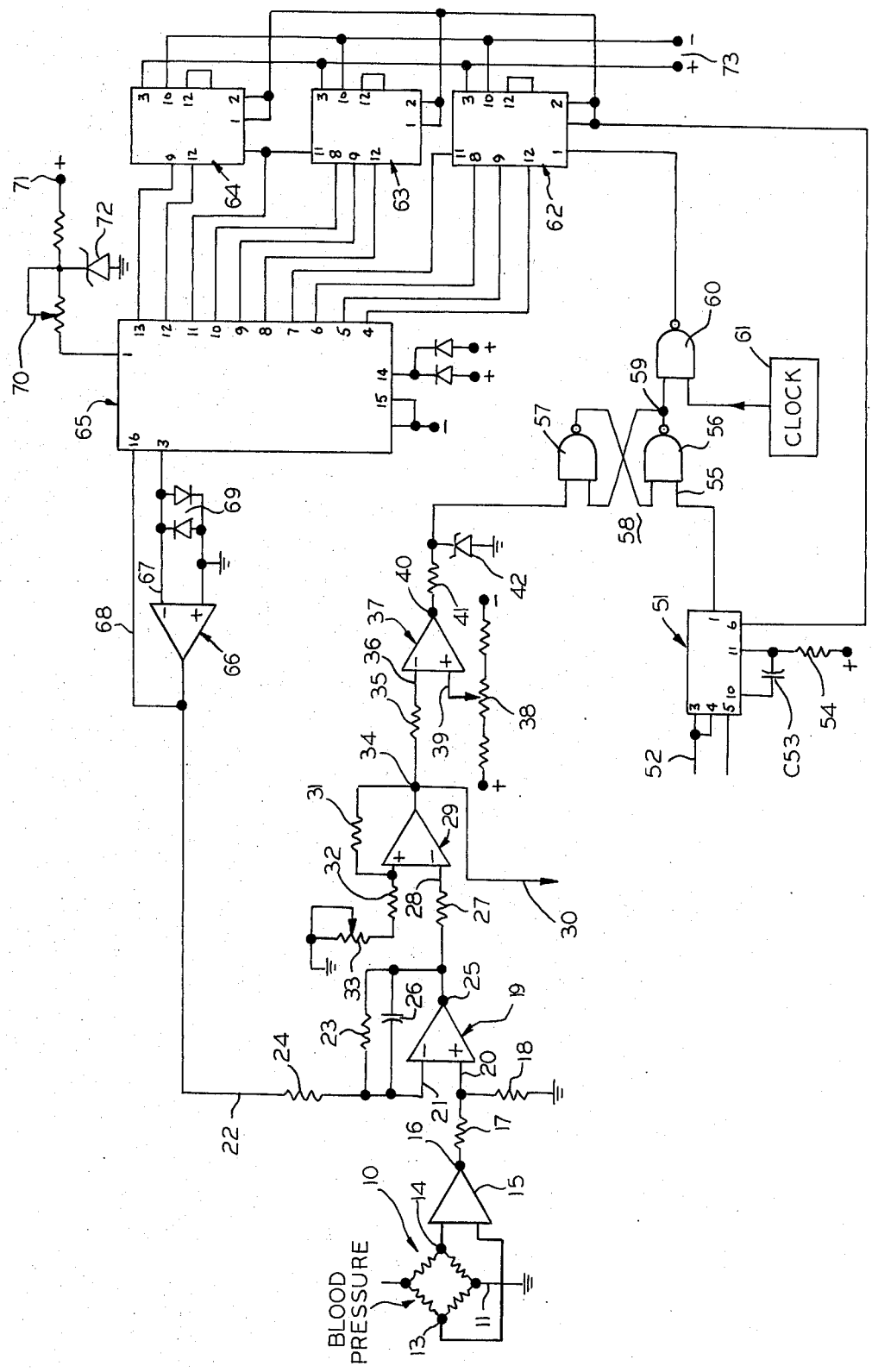

BLOOD PRESSURE AMPLIFIER WITH ZERO BALANCING MEANS

BACKGROUND OF THE INVENTION

A commonly used blood pressure sensor comprises a chamber having a catheter leading to a blood vessel. The chamber has a diaphragm which, when in use, will have blood pressure on one side and atmospheric pressure on the other side. Atmospheric pressure is the zero reference pressure. Pressure variations on the diaphragm are transduced to corresponding electric signals by the diaphragm acting on a strain gauge bridge. Differential signals across the output terminals of the bridge are amplified and the amplified signal is functionally related to blood pressure.

When the blood pressure side of the diaphragm is vented to the atmosphere as it is before the sensor is put into use, an offset voltage can exist within the amplifier due to unequal resistances in the arms of the strain gauge bridge. This offset voltage must be balanced or corrected for the ensuing blood pressure measurements to be accurate. Hence, it is necessary to zero balance the gauge. Zero balancing has been done traditionally by manually adjusting a potentiometer across one arm of the bridge. The accuracy of the balance is a function of the sensitivity of the readout and the skill of the person making the adjustment. In many hospitals, this adjustment is performed by a trained technician rather than a nurse. Most nurses do not feel comfortable in performing this procedure because they are unfamiliar with its requirements and often several trials are required to obtain an accurate zero balance. The procedure is time consuming. If it is not done accurately, the ensuing blood pressure measurements will be inaccurate.

SUMMARY OF THE INVENTION

A primary object of this invention is to overcome the above noted problems by providing a circuit for automatically balancing a blood pressure signal amplifier quickly and accurately.

Another object of this invention is to facilitate balancing of a blood pressure signal amplifier by an unskilled person.

How the foregoing and other more specific objects of the invention are achieved will be evident in the course of the ensuing description of an illustrative embodiment of the invention which is shown in the drawing.

In general terms, the invention is characterized by feeding the amplified output signal from the blood pressure-to-electric signal transducer to one input of a summing device. At the time of balancing, the blood pressure transducer signal is referenced to the atmosphere which is zero reference. The other input of the summing device is an offset correction reference voltage to provide a zero level at the output of the summing device. Clock pulse counting devices are used. A zero balance command starts the counting. The output of the binary counters is converted to an analog voltage by means of a digital-to-analog converter and the analog signal becomes the feedback reference voltage to the summing device. The analog voltage increases at a substantially constant or linear rate since the interval between counted pulses is constant. At the beginning of the zero balance cycle, before counting begins, the output of the summing device is set negative with respect to the reference voltage on a comparator, causing the comparator output to be at a certain level. As soon as the output of the summing device crosses the reference voltage, the comparator switches to a different output level and causes counting to stop. The count and corresponding analog correction voltage is stored and is applied to the summing junction when the immediately ensuing blood pressure measurement is in progress. The correction voltage is held until a new zero balance is commanded.

DESCRIPTION OF THE DRAWING

The single drawing constitutes a diagram of the circuitry for automatic balancing of a blood pressure transducer.

DESCRIPTION OF A PREFERRED EMBODIMENT

The drawing shows a bridge 10 comprised of four arms in which there are resistive strain gauges. A constant d-c voltage is applied to terminals 11 and 12 of the bridge. When the bridge is excited, changes in pressure create changes in the bridge impedance, resulting in a differential signal across output terminals 13 and 14 of the bridge. This differential signal is fed into a single ended output differential amplifier 15 to amplify and convert it to a single signal. When the offset voltage only is fed to amplifier 15 as it is during zero balancing, an amplified version of this offset voltage appears on output terminal 16 of amplifier 15. During blood pressure measurement, the voltage on terminal 16 is the algebraic sum of the differential voltage due to blood pressure and the offset voltage.

After the differential signal is converted to a single ended form, it is fed through a voltage divider comprised of resistors 17 and 18 the midpoint of which connects to the noninverting terminal of a differential amplifier 19 which is used to compensate for the initial zero offset of the strain gauge bridge 10.

The noninverting input terminal 20 and the inverting input terminal 21 of differential amplifier 19 constitute inputs to the summing device. The correction signal, the development of which will be explained later, comes in on line 22 to terminal 21 of amplifier 19. Usually the maximum offset voltage to be corrected or compensated for is in the range of ± 60 millimeters of mercury. The incoming pressure signal to noninverting terminal 20 may only be, for example, about 10 millivolts per millimeter of mercury and if the capability of zeroing ± 60 millimeters of mercury is to be achieved, the output of the zero reference circuit has to be adjusted since the output of the reference circuit may range from +5 to −5 volts, for example. The adjustment is made by selecting the proper ratio for resistors 23 and 24 that results in a voltage on the output terminal 25 of amplifier 19 equivalent to 60.5 millimeters of mercury when, in this example, plus to minus 5 volts is applied as a correction voltage to input 21 of amplifier 19. Capacitor C26 in the feedback loop of amplifier 19 is for smoothing.

The output 25 of amplifier 19 connects through resistor 27 to the inverting terminal 28 of an amplifier 29 which sets the gain for the usable blood pressure output signal on line 30. Line 30 may drive any suitable known type of meter calibrated in terms of millimeters of mercury blood pressure per millivolts, for instance. The gain of amplifier 29 is set in the customary way by proper selection of the ratio between the feedback resistor 31 and the input resistance represented by resistors 32 and 33. Resistor 33 is adjustable to permit setting the gain exactly where it is wanted.

During balancing, the conditioned offset signal from output terminal 34 of amplifier 29 is fed through a resistor 35 to the inverting input 36 of a comparator 37. At the beginning of the zero balance cycle, the input 36 to comparator 37 is set negative with respect to the reference voltage for the comparator which is developed on a potentiometer 38 that is connected to noninverting input 39 of comparator 37. As soon as the correction voltage, applied by way of line 22 to input 21 of amplifier 19, results in the voltage on the input 36 of comparator 37 crossing the reference voltage from potentiometer 38, the output terminal 40 of the comparator goes high. This results ultimately in the correction voltage being sustained and stored and applied to input 21 of amplifier 19 when blood pressure is subsequently measured with the transducer 10. The output signal from comparator terminal 40 is current limited by a resistor 41 and is voltage limited by a zener diode 42.

When zeroing of the blood pressure sensor is required, the correction signal mentioned earlier is produced. An automatic zero correction circuit is activated to accomplish zeroing in less than one second. The zero correction circuit comprises a monostable multivibrator 51, herein called a one-shot multivibrator, which has an input line 52 connected to its pins 3 and 4. A command signal for initiating zero correction signal development comes in on line 52. The command signal triggers the one-shot multivibrator 51 for about 15 milliseconds determined by time constant circuit comprised of capacitor C53 and resistor 54. When the one-shot multivibrator 51 is triggered, its pin 6 goes high and its pin 1 goes low. Pin 1 is connected to an input 55 of a NAND gate 56 which together with another NAND gate 57 comprises an RS flip-flop which is generally designated by the reference numeral 58 and is characterized as a switching means. When pin 1 of one-shot 51 goes low, it sets the RS flip-flop 58 causing the output 59 of flip-flop gate 56 to go high, thereby enabling a NAND gate 60. When NAND gate 60 is enabled, clock pulses are permitted to pass from a clock pulse generator 61 to an array of binary counters 62, 63 and 64. By way of example, clock pulse generator 61 may have a fixed frequency of 1 Hz. The value of the binary number representation of the counts increases linearly with respect to time.

Triggering of the one-shot 51, resulting in its pin 6 going low, also clears counters 62, 63 and 64 for 15 milliseconds after which the clock forces these counters to count up at a constant or linear rate. The counters are connected to pins 4–13 of a digital-to-analog converter which is generally designated by the reference numeral 65. The counters may be type 7493. The digital-to-analog converter 65 may be a type DAC 100. The digital-to-analog converter 65 is a current output device so its output is supplied to an amplifier 66 which acts as a voltage output device which has its inverting input 67 connected to pin 3 of converter 65 and has a feedback loop 68 connected to pin 16 of the converter. The amplifier is limited by a pair of reverse connected diodes 69. The analog voltage resulting from converting the binary counts of the counters 62–64 increases rapidly during counting and this analog voltage from the output of amplifier 66 is fed by way of line 22 to the inverting input 21 of differential amplifier 19 at the beginning of the loop. The final analog voltage may be obtained in less than a second.

Digital-to-analog converter 65 uses complementary inputs, that is, with all zeros present on its inputs, the output goes to the positive limit. When the counter outputs all go to logic 1, then the output of the converter 65 goes to the negative limit. As mentioned, in this example, the limits are about plus or minus 5 volts. The limits are adjusted for a symmetrical output with a potentiometer 70 driven from a source 71. The adjustment voltage is limited by a zener diode 72.

The zeroing is accomplished as counters 62-64 continue to count until output terminal 34 of amplifier 29 crosses zero resulting from the correction signal to input 21 of amplifier 19 and the offset signal to input 20 thereof becoming equal. At this point, comparator 37 switches, and its output goes low, causing the RS flip-flop 58 to reset which means that its output 59 goes low again so as to disable gate 60 and terminate clock pulse input to counters 62–64. Thus, the counters stop and hold the last count and this maintains the corresponding analog correction voltage which was developed by the highest count.

The customary logic level voltage of about 5 volts is applied to the counters 62–64 from a source 73 which connects to pins 3 and 10 of the counters.

In summary, a rapid and essentially automatic offset signal balancing device for a blood pressure transducer has been described. All the operator has to do is make sure that the offset signal from the transducer is coupled to the input of the device and then operate a switch to trigger a correction signal producing circuit. When the correction signal compensates the offset signal the procedure is complete. This is done in a very short time and the operator need not be concerned about how it is done nor about its accuracy since accuracy is inherent in the device.

Although the new means for developing a correction signal for a blood pressure amplifier has been described in considerable detail, it will be understood that such description is intended to be illustrative rather than limiting, for the invention may be used with other waveform amplifiers that are adversely affected by an offset signal so the scope of the invention is to be limited only by interpretation of the claims which follow.

I claim:

1. Means for correcting a device that responds to signals from a blood pressure transducer for the offset signal of the transducer, comprising:
    a. summing amplifier means having an output and respective inputs for a correction signal and a signal from said transducer,
    b. comparator means having an output and also having at least two inputs one of which is coupled with said amplifier means output, the output of said comparator means changing state in response to a correction signal and reference voltage signal to said summing means inputs becoming substantially equal, and means for supplying a reference voltage signal to an input to said comparator means,
    c. a source of pulses having a constant repetition rate,
    d. pulse counting means coupled with said source, said counting means being constructed and arranged for producing a digital signal corresponding in magnitude with the number of pulses counted and which signal increases in magnitude at a substantially constant rate, e. means for activating said counting means when production of a correction signal is desired,
f. means for converting said digital signal representative of the count by said counting means to an analog signal and means for storing said analog signal which constitutes said correction signal,
g. means for coupling said correction signal to its summing means input,
h. means for deactivating said counting means in response to said comparator means output changing state,
i. gate means interposed between said pulse source and said counting means,
j. switch means for controlling said gate means,
k. one-shot multivibrator means for controlling said switch means and for clearing said counting means, said counting means being cleared when said multivibrator means is being switched to enable gating of pulses through said gate means when said multivibrator is in another of its states,
l. said switch means also responding to said comparator means changing state by disabling said gate means from providing pulses to said counting means to thereby effect said deactivating of said counting means.

2. Means for correcting a device that responds to signals from a blood pressure transducer for the unbalance signal therefrom prior to use of the transducer for sensing blood pressure, comprising:
a. summing amplifier means having an output and having an input for a signal from the transducer and an input for a signal to compensate said unbalance signal,
b. comparator means having an input controlled by the signal from the output of said amplifier means and having an output, the output of said comparator means changing state when said unbalance compensating signal and said transducer signal are substantially equal,
c. a source of pulses having a constant repetition rate,
d. pulse counting means responsive to receiving pulses by producing a digital signal corresponding with the number of pulses counted, said signal changing at a substantially constant rate during counting,
e. means for converting said digital signal to an analog signal and storage means for said signal, said analog signal constituting said unbalance compensating signal, means for coupling said analog signal to said summing amplifier means input,
f. gate means coupling said pulse source with said counting means,
g. means for resetting said counting means when production of a balancing signal is desired,
h. means for enabling said gate means to provide pulses to said counting means,
i. means for disabling said gate means in response to said comparator means changing state, whereby to effect storage of said analog signal for continuous unbalance compensation during ensuing signals from said transducer,
j. said summing amplifier means comprising a differential amplifier having said unbalance compensating signal and said transducer signal inputs, and
k. second signal amplifier means interposed between said differential amplifier and said comparator means, the output signal of said second amplifier means being functionally related to the blood pressure indicative signal from said transducer means corrected for said unbalance.

* * * * *